US011455792B2

(12) United States Patent
Maeng et al.

(10) Patent No.: US 11,455,792 B2
(45) Date of Patent: Sep. 27, 2022

(54) ROBOT CAPABLE OF DETECTING DANGEROUS SITUATION USING ARTIFICIAL INTELLIGENCE AND METHOD OF OPERATING THE SAME

(71) Applicant: LG ELECTRONICS INC., Seoul (KR)

(72) Inventors: Jichan Maeng, Seoul (KR); Beomoh Kim, Seoul (KR); Taehyun Kim, Seoul (KR); Wonho Shin, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 455 days.

(21) Appl. No.: 16/577,865

(22) Filed: Sep. 20, 2019

(65) Prior Publication Data
US 2020/0019779 A1 Jan. 16, 2020

(30) Foreign Application Priority Data

Aug. 5, 2019 (KR) ........................ 10-2019-0095116

(51) Int. Cl.
*B60Q 1/50* (2006.01)
*G06V 20/10* (2022.01)
(Continued)

(52) U.S. Cl.
CPC ............ *G06V 20/10* (2022.01); *A47L 9/2826* (2013.01); *A47L 11/4011* (2013.01);
(Continued)

(58) Field of Classification Search
CPC . B60Q 1/24; B60Q 1/50; G06V 10/82; G06V 20/10; G10L 15/16; G10L 15/22;
(Continued)

(56) References Cited

U.S. PATENT DOCUMENTS 6,678,582 B2 * 1/2004 Waled .................... G06N 3/008
318/568.22
7,139,651 B2 * 11/2006 Knowlton ............... G01S 19/50
701/472

(Continued)

OTHER PUBLICATIONS

Martinez-Martin et al., Object Detection and Recognition for Assistive Robots: Experimentation and Implementation, 2017, IEEE, p. 123-138 (Year: 2017).*

(Continued)

*Primary Examiner* — McDieunel Marc
(74) *Attorney, Agent, or Firm* — Lee, Hong, Degerman, Kang & Waimey PC

(57) ABSTRACT

A robot for detecting a dangerous situation using artificial intelligence includes a memory configured to store a voice recognition model for inferring whether a current situation is the dangerous situation from voice data and an image recognition model for inferring whether the current situation is the dangerous situation from image data, and a processor configured to acquire one or more of the voice data or the image data and output a notification indicating the dangerous situation when the dangerous situation is detected from the voice data using the voice recognition model or when the dangerous situation is detected from the image data using the image recognition model.

10 Claims, 7 Drawing Sheets

(51) Int. Cl.

| | |
|---|---|
| *G10L 15/16* | (2006.01) |
| *G10L 15/22* | (2006.01) |
| *G05D 1/00* | (2006.01) |
| *G06N 3/08* | (2006.01) |
| *B25J 11/00* | (2006.01) |
| *B25J 9/16* | (2006.01) |
| *A47L 11/40* | (2006.01) |
| *A47L 9/28* | (2006.01) |
| *G06N 3/04* | (2006.01) |

(52) U.S. Cl.
CPC ......... *A47L 11/4061* (2013.01); *B25J 9/1697* (2013.01); *B25J 11/0085* (2013.01); *B60Q 1/50* (2013.01); *G05D 1/0088* (2013.01); *G06N 3/04* (2013.01); *G06N 3/08* (2013.01); *G10L 15/16* (2013.01); *G10L 15/22* (2013.01); *A47L 2201/04* (2013.01); *G05D 2201/0203* (2013.01)

(58) Field of Classification Search
CPC .... B25J 11/008; B25J 9/1697; B25J 11/0005; B25J 11/0085; G06N 3/08; G06N 3/04; G06N 3/008; A47L 9/2826; A47L 11/4011; A47L 11/4061; A47L 7/0085; A47L 2201/04; A47L 2201/06; G05D 1/0088; G05D 1/0246; G05D 2201/0203; G05D 1/0223; G05D 2201/0209
See application file for complete search history.

(56) References Cited

U.S. PATENT DOCUMENTS

| | | | | |
|---|---|---|---|---|
| 7,146,248 | B2* | 12/2006 | Lent | C22B 11/00 700/254 |
| 7,584,020 | B2* | 9/2009 | Bruemmer | G05D 1/024 701/25 |
| 7,620,477 | B2* | 11/2009 | Bruemmer | G05D 1/0088 700/262 |
| 7,668,621 | B2* | 2/2010 | Bruemmer | G06N 3/008 318/568.22 |

OTHER PUBLICATIONS

Roy, Grounded Spoken Language Acquisition: Experiments in Word Learning, 2003, IEEE, p. 197-209 (Year: 2003).*
Albus, Outline fora theory of intelligence, 1991, IEEE, p. 473-509 (Year: 1991).*
Dunai et al., Obstacle detectors for visually impaired people, 2014, IEEE, p. 809-816 (Year: 2014).*

* cited by examiner

ROBOT CAPABLE OF DETECTING DANGEROUS SITUATION USING ARTIFICIAL INTELLIGENCE AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0095116, filed on Aug. 5, 2019, the contents of which are hereby incorporated by reference herein in its entirety

BACKGROUND

The present invention relates to an artificial intelligence device capable of detecting a dangerous situation using artificial intelligence.

Recently, with explosive increase in number of passengers who use airports and efforts to leap into smart airports, methods of providing services using robots in airports or multiplexes have been discussed.

When intelligent robots are introduced into airports or multiplexes, it is expected that the robots can perform the unique roles of people which cannot be replaced with conventional computer systems, thereby achieving quantitative and qualitative improvement of the provided services.

One of the most important functions of the robots in places where many people gather, including the airports, is to provide users with information such as guidance information.

In the past, robots cannot actively detect dangerous situations such as hazardous situations or emergencies and only notified management offices or emergency rooms of the dangerous situations by user input.

In this case, the dangerous situations were left unhandled until arrival of persons capable of handling the dangerous situations.

SUMMARY

An object of the present invention is to provide a robot capable of automatically detecting a dangerous situation such as a hazardous situation or emergency and reporting the dangerous situation or actively taking action for the dangerous situation.

Another object of the present invention is to provide a robot capable of automatically detecting a dangerous situation through voice or an image and appropriately taking action for the dangerous situation.

A robot for detecting a dangerous situation using artificial intelligence according to an embodiment of the present invention may acquire one or more of voice data or image data; and output a notification indicating the dangerous situation when the dangerous situation is detected from the voice data using a voice recognition model or when the dangerous situation is detected from the image data using an image recognition model.

The robot according to the embodiment of the present invention can recognize the dangerous situation using an artificial neural network based voice recognition model and image recognition model supervised-learned through a deep learning algorithm or a machine learning algorithm.

DETAILED DESCRIPTION OF THE EMBODIMENTS

<Artificial Intelligence (AI)>

Figure 1:
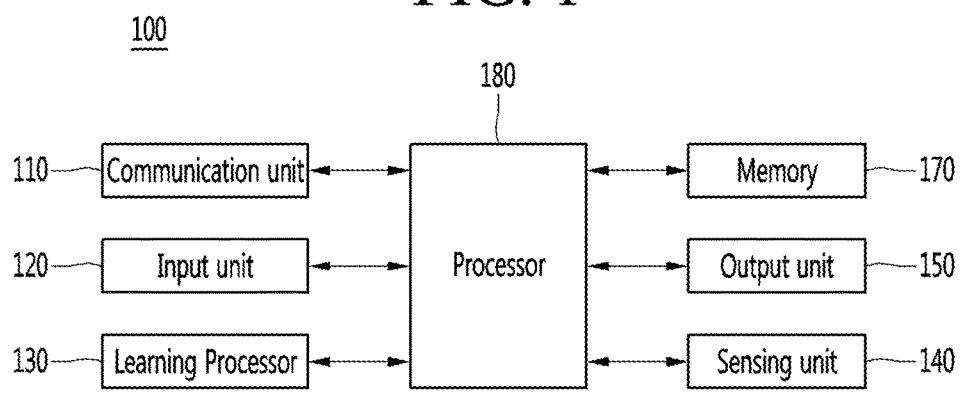
FIG. 1 is a view showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
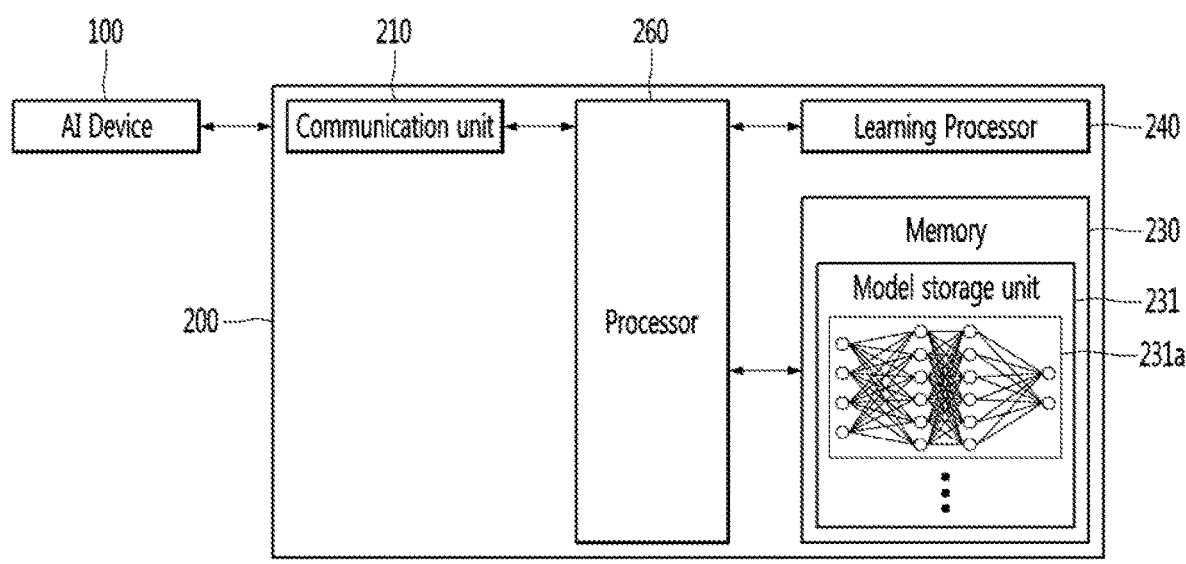
FIG. 2 is a view showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
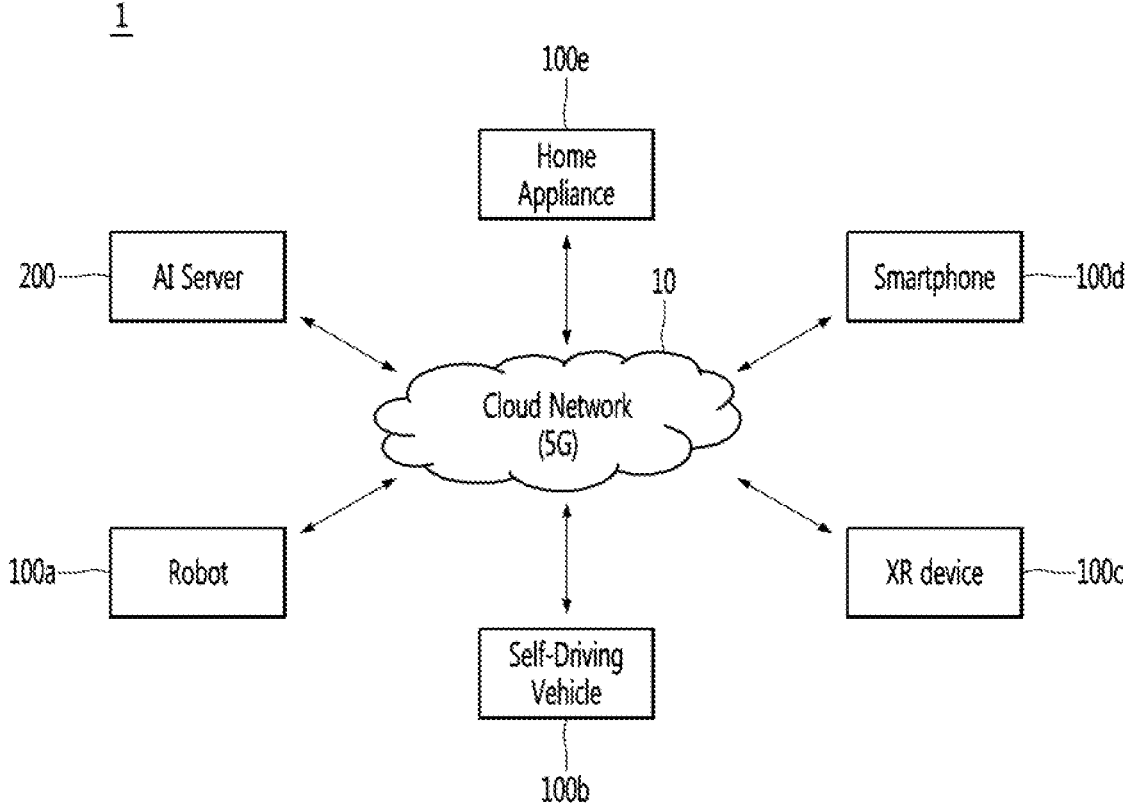
FIG. 3 is a view showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
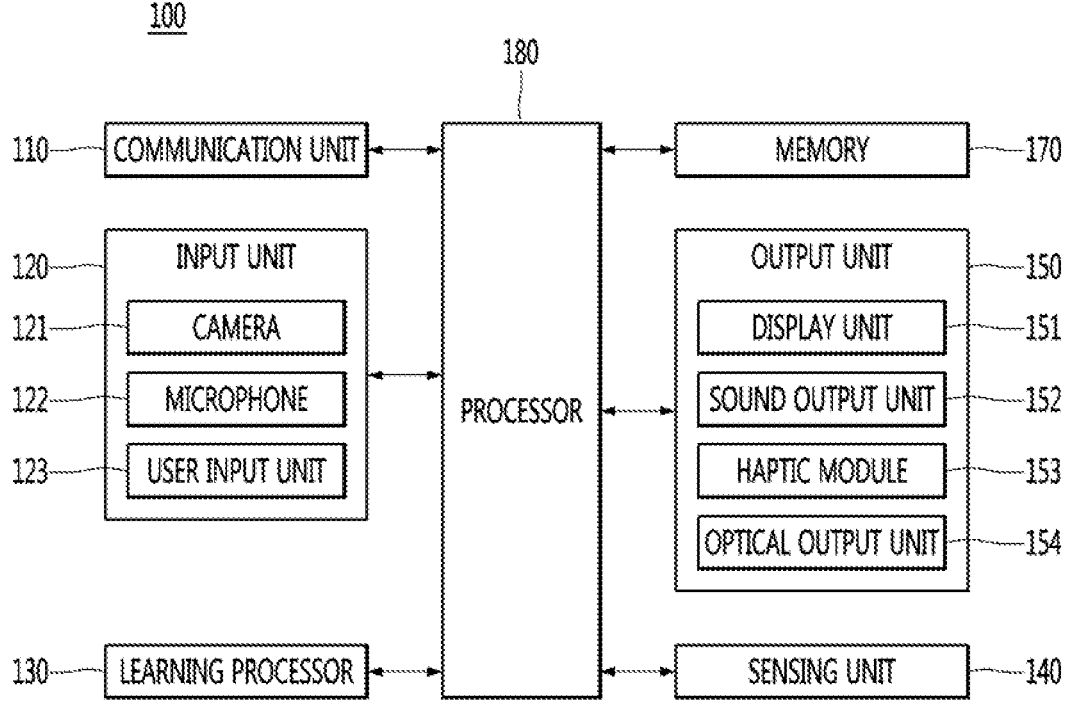
FIG. 4 is a view showing an artificial intelligence (AI) device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
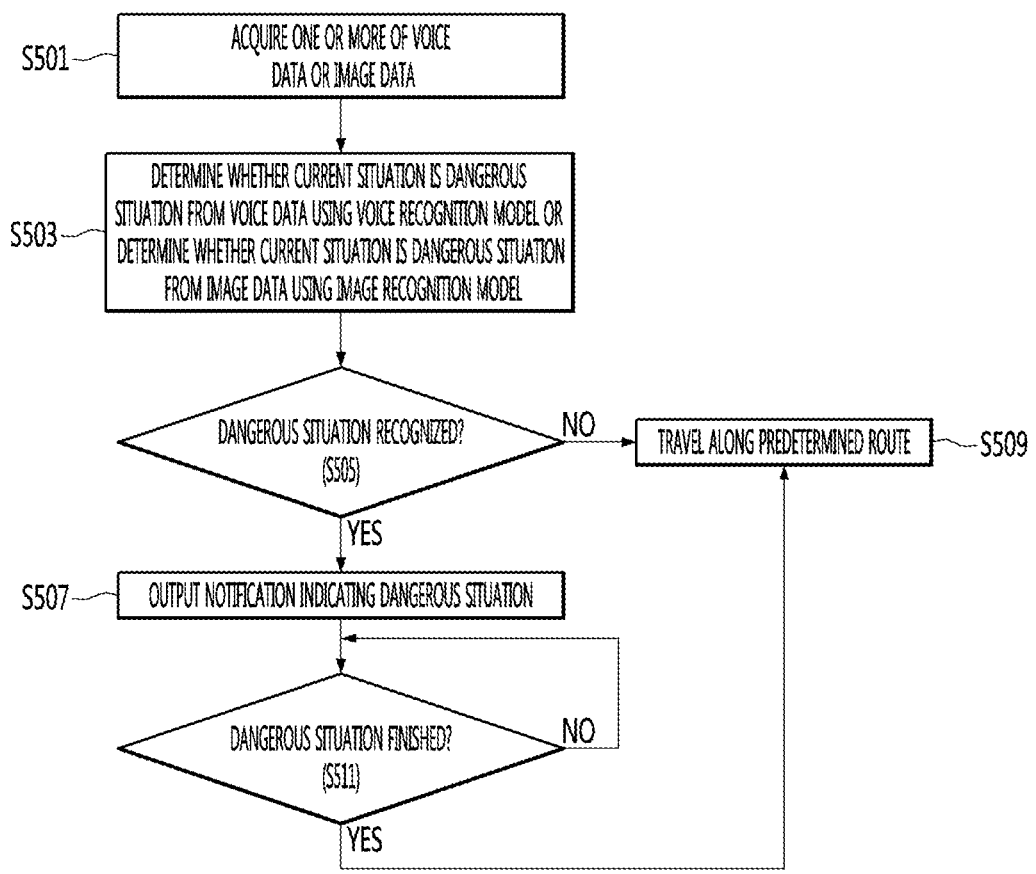
FIG. 5 is a flowchart illustrating a method of operating a robot capable of detecting a dangerous situation according to an embodiment of the present invention.

FIG. 5 is a flowchart illustrating a method of operating a robot capable of detecting a dangerous situation according to an embodiment of the present invention.

The processor 180 of the robot 100*a* acquires one or more of voice data or image data (S501).

The processor 180 may receive the voice data through the microphone 122.

The processor 180 may receive the captured image data through the camera 121.

The processor 180 may always or periodically activate the microphone 122 or the camera 121 to acquire the voice data or the image data.

In another example, the processor 180 may periodically receive the image data or the voice data from the camera or the microphone disposed on the traveling route of the robot 100*a* through the communication unit 110.

The processor 180 determines whether a current situation is a dangerous situation from the voice data using a voice recognition model or whether a current situation is a dangerous situation from the image data using an image recognition model (S503).

Each of the voice recognition model and the image recognition model may be an artificial neural network based model learned using a deep learning algorithm or a machine learning algorithm.

The voice recognition model and the image recognition model may be learned through supervised learning.

The voice recognition model and the image recognition model may be learned by the learning processor 240 of the AI server 200 and the learned models may be installed in the memory 170 of the robot 100*a* through the communication unit 210.

The voice recognition model may be a model for inferring whether a current situation is a dangerous situation or a non-dangerous situation from the voice data.

The image recognition model may be a model for inferring whether a current situation is a dangerous situation or a non-dangerous situation from the image data.

The image recognition model may recognize an object from the image data and infer whether a current situation is a dangerous situation according to the state of the recognized object.

Each of the voice recognition model and the image recognition model may be a model learned and stored through the learning processor 130 of the artificial intelligence device 100.

In another example, each of the voice recognition model and the image recognition model may be a model learned through the learning processor 240 of the AI server 200 and received and stored from the AI server 200 through the communication unit 110.

The voice recognition model and the image recognition model will be described in detail with reference to the following drawings.

Figure 6:
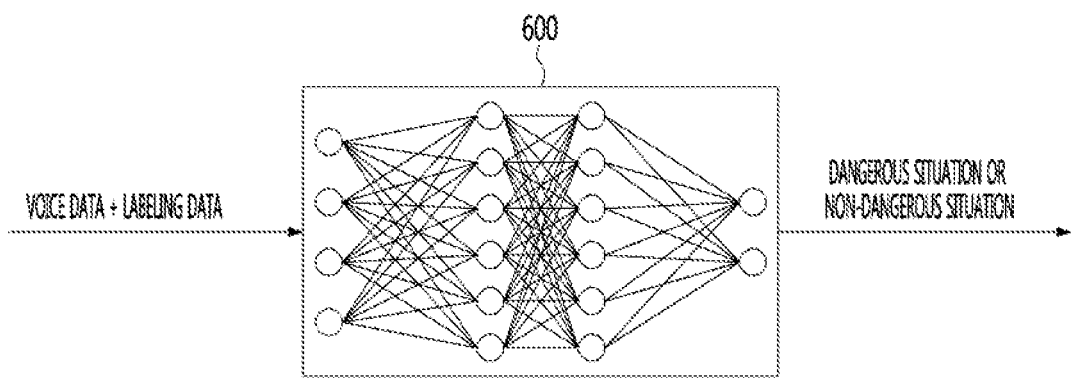
FIG. 6 is a view illustrating an example of a voice recognition model for determining a dangerous situation from voice data.
Figure 7:
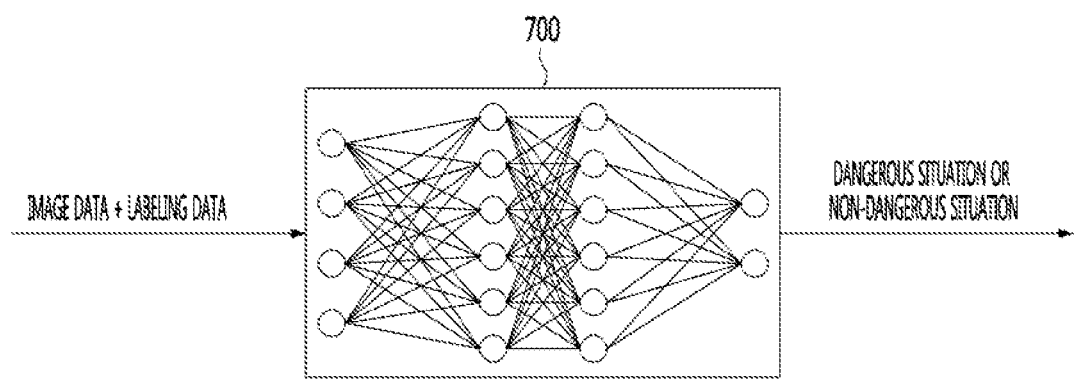
FIG. 7 is a view illustrating an example of an image recognition model for determining a dangerous situation from image data.

FIG. 6 is a view illustrating an example of a voice recognition model for determining a dangerous situation from voice data, and FIG. 7 is a view illustrating an example of an image recognition model for determining a dangerous situation from image data.

The voice recognition model 600 may be a model composed of an artificial neural network learned to infer a dangerous situation indicating a feature point using, as input data, voice data having the same form as actual voice data.

The voice recognition model 600 may be learned through supervised learning. Specifically, the voice data used to learn the voice recognition model 600 may be labeled with a current situation (a dangerous situation or a non-dangerous situation) and the voice recognition model 600 may be learned using the labeled voice data.

That is, learning data may include image data for learning and data on a current situation (a dangerous situation or a non-dangerous situation) labeled with voice data for learning.

For example, the voice data labelled with the dangerous situation may include a word <help>. In contrast, the voice data labelled with the non-dangerous situation may include a sentence <I will help>.

The voice recognition model 600 may be learned with goal of accurately inferring the labeled current situation from given voice data.

The cost function of the voice recognition model 600 may be expressed by a squared mean of a difference between the label of the current situation corresponding to the voice data for learning and a current situation inferred from each learning data.

Model parameters included in the artificial neural network may be learned through learning to minimize the cost function.

When an input feature vector is extracted from the voice data for learning and input to the voice recognition model, a result of determining the current situation may be output as a target feature vector.

The voice recognition model 600 may be learned to minimize the cost function corresponding to a difference between the output target feature vector and the labeled current situation.

For example, the target feature point of the voice recognition model 600 may be composed of an output layer of a single node indicating whether the current situation is a dangerous situation. The target feature point may have a value of "1" in a dangerous situation and have a value of "0" in a non-dangerous situation.

In this case, the output layer of the voice recognition model 600 may use sigmoid, hyperbolic tangent, etc. as an activation function.

In another example, the target feature point of the voice recognition model 600 may be composed of output layers of two output nodes indicating a current situation, and each output node may mean a dangerous situation or a non-dangerous situation.

That is, the target feature point (target feature vector) may be composed of a dangerous situation or a non-dangerous situation, and the target feature point may have a value of "(1, 0)" in a dangerous situation and have a value of a value of "(0, 1)" in a non-dangerous situation. In this case, the output layer of the voice recognition model 600 may use softmax as an activation function.

Next, FIG. 7 will be described.

An image recognition model 700 may be a model composed of an artificial neural network learned to infer a dangerous situation indicating a feature point using, as input data, image data having the same form as actual image data.

The image recognition model 700 may be learned through supervised learning. Specifically, the image data used to learn the image recognition model 700 may be labeled with a current situation (a dangerous situation or a non-dangerous situation) and the image recognition model 700 may be learned using the labeled image data.

That is, learning data may include image data for learning and data on a current situation (a dangerous situation or a non-dangerous situation) labeled with image data for learning.

The image recognition model 700 may be learned with goal of accurately inferring the labeled current situation from given image data.

The image recognition model 700 may recognize an object from the image data and infer whether a current situation is a dangerous situation through the state of the object.

The cost function of the image recognition model 700 may be expressed by a squared mean of a difference between the label of the current situation corresponding to the image data for learning and a current situation inferred from each learning data.

Model parameters included in the artificial neural network may be learned through learning to minimize the cost function.

When an input feature vector is extracted from the image data for learning and input to the image recognition model 700, a result of determining the current situation may be output as a target feature vector.

The image recognition model 700 may be learned to minimize the cost function corresponding to a difference between the output target feature vector and the labeled current situation.

For example, the target feature point of the image recognition model 700 may be composed of an output layer of a single node indicating whether the current situation is a dangerous situation. The target feature point may have a value of "1" in a dangerous situation and have a value of "0" in a non-dangerous situation.

In this case, the output layer of the image recognition model 700 may use sigmoid, hyperbolic tangent, etc. as an activation function.

In another example, the target feature point of the image recognition model 700 may be composed of output layers of two output nodes indicating a current situation and each output node may mean a dangerous situation or a non-dangerous situation.

That is, the target feature point (target feature vector) may be composed of a dangerous situation or a non-dangerous situation, and the target feature point may have a value of "(1, 0)" in a dangerous situation and have a value of a value of "(0, 1)" in a non-dangerous situation. In this case, the output layer of the image recognition model 700 may use softmax as an activation function.

FIG. 5 will be described again.

When a dangerous situation is recognized as the result of determination (S505), the processor 180 outputs a notification indicating the dangerous situation (S507).

In one embodiment, the processor 180 may output the notification indicating the dangerous situation through the output unit 150.

Specifically, the processor 180 may display the notification indicating that the current situation is the dangerous situation through the display unit 151 or audibly output the notification indicating that the current situation is the dangerous situation through the sound output unit 152.

In another example, the processor 180 may output light indicating the dangerous situation through the optical output unit 154. The processor 180 may control the optical output unit 154 to identify a dangerous region corresponding to the dangerous situation.

In another example, the processor 180 may transmit the notification indicating that the current situation is the dangerous situation to the AI server 200.

When the dangerous situation is not recognized as the result of determination (S505), the processor 180 travels along a predetermined route (S509).

When the result of inferring the voice recognition model and the image recognition model is determined as a non-dangerous situation, the processor 180 may control a traveling unit (not shown) to drive the robot along the predetermined route.

Meanwhile, the processor 180 determines whether the dangerous situation is finished (S511), after the notification is output according to recognition of the dangerous situation.

When the dangerous situation is related to a specific object, the processor 180 may determine whether the object has been removed.

The processor 180 may determine whether the object related to the dangerous situation has been removed, based on the image captured through the camera 121.

When the object related to the dangerous situation has been removed from the captured image, the processor 180 may determine that the dangerous situation is finished.

When the dangerous situation is finished, the processor 180 drives the robot along the predetermined route (S509).

Figure 8:
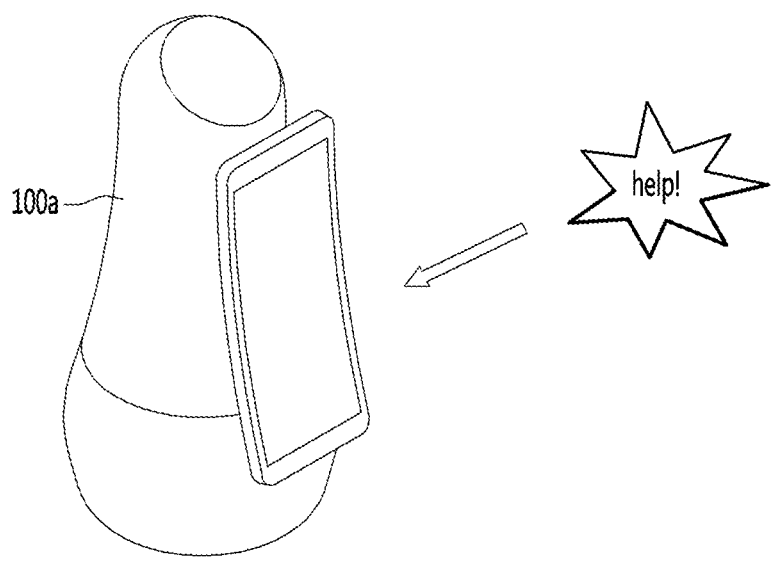
FIGS. 8 and 9 are views illustrating a process of recognizing a dangerous situation according to an embodiment of the present invention.
Figure 9:
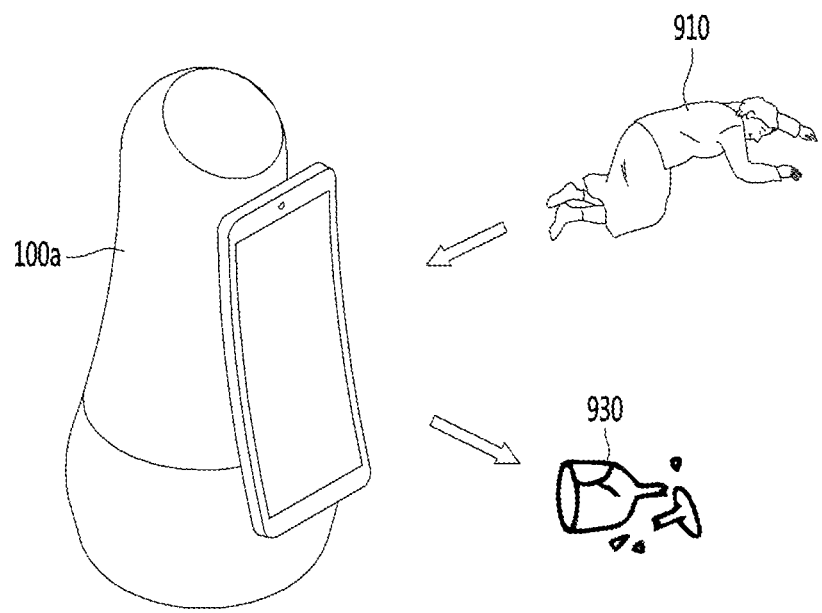

FIGS. 8 and 9 are views illustrating a process of recognizing a dangerous situation according to an embodiment of the present invention.

In particular, FIG. 8 is a view illustrating an example in which the robot 100a recognizes the dangerous situation through voice data, and FIG. 9 is a view illustrating an example in which the robot 100a recognizes the dangerous situation through image data.

First, FIG. 8 will be described.

The robot 100a may receive voice data corresponding to voice <help> through the microphone 122 while traveling along the predetermined route.

The robot 100a may determine that the current situation is the dangerous situation through voice <help> using the previously learned voice recognition model 600.

Next, FIG. 9 will be described.

The robot 100a may capture a surrounding image through the camera 121 while traveling along the determined route. The robot 100a may determine whether a dangerous situation occurs from the image data of the captured image using the image recognition model 700.

The robot 100a may determine that the current situation is the dangerous situation from the image data indicating a state 910 in which a person has fallen, using the image recognition model 700.

The robot 100a may recognize an object, that is, a person, from the image data and identify the state of the recognized person, using the image recognition model 700. When the identified person has fallen, the robot 100a may recognize the current situation as the dangerous situation.

The robot 100a may determine that the current situation is the dangerous situation from the image data indicating a state 930 in which a cup has been broken, using the image recognition model 700.

The robot 100a may recognize an object, that is, a cup, from the image data and identify the state of the recognized cup, using the image recognition model 700. When the identified cup has been broken, the robot 100a may recognize the current situation as the dangerous situation.

Next, FIG. 10 will be described.

Figure 10:
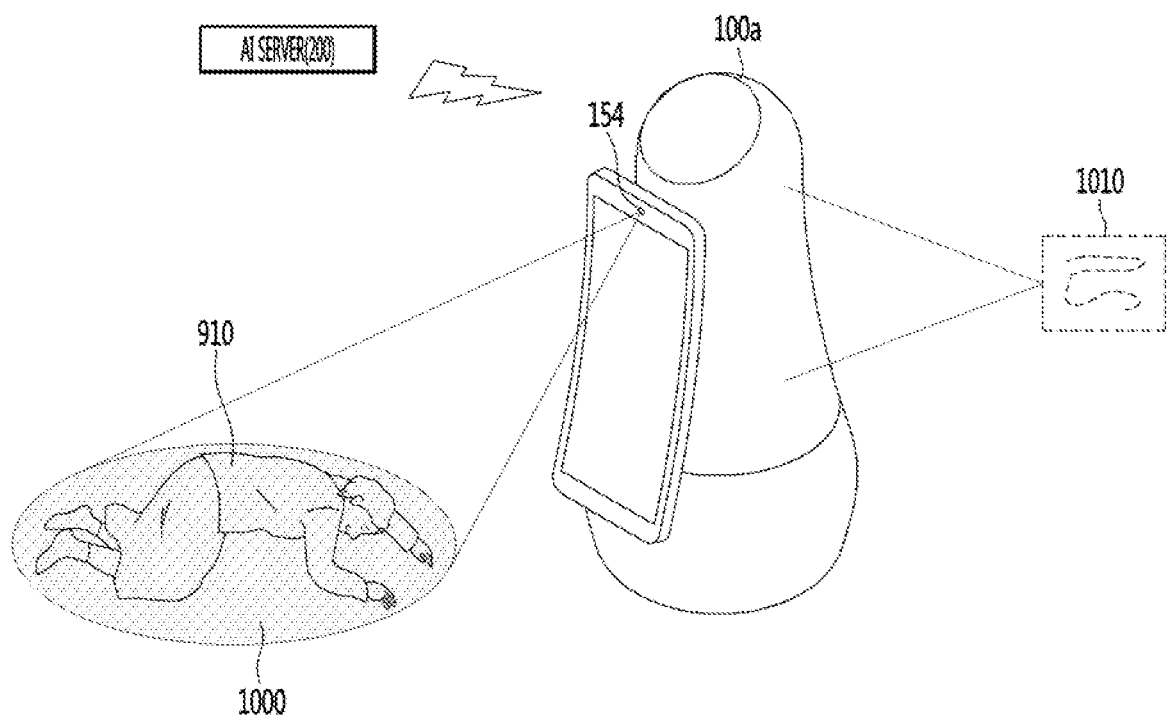
FIG. 10 is a view illustrating action taken by a robot when a dangerous situation is recognized according to an embodiment of the present invention.

FIG. 10 is a view illustrating action taken by a robot when a dangerous situation is recognized according to an embodiment of the present invention.

Referring to FIG. 10, the robot 100a is traveling along a predetermined route 1010.

The robot 100a may recognize the dangerous situation based on the captured image data while traveling. That is, the robot 100a may recognize the state in which the person has fallen based on the image data and determine this as the dangerous situation.

When the dangerous situation is recognized, the robot 100a may acquire a dangerous region 1000 for identifying the dangerous situation. The dangerous region 1000 may be a region where the recognized object (person) is placed.

The robot 100a may output light through the optical output unit 154 as much as a region occupying the dangerous region 1000 in order to report the dangerous situation.

In another example, the robot 100a may further transmit a message for requesting action for the dangerous situation to the AI server 200. The AI server 200 may transmit the message to a management office or a rescue party.

In another example, the robot 100a may directly transmit the notification to the management office or the rescue party.

In another example, when the dangerous situation is emergency, the robot 100a may search for a person capable of taking emergency measures. The robot 100a may output sound for inquiring about a person capable of taking emergency measures.

In another example, the robot 100a may transmit a message for outputting a guide broadcast for inquiring about a person capable of taking emergency measures to the AI server 200.

In another example, the robot 100a may output sound indicating that persons other than authorized persons cannot access the dangerous region 1000.

According to the embodiment of the present invention, the robot 100a may recognize the dangerous situation while traveling and notifying the outside of the recognized dangerous situation. Therefore, other persons may be notified of the dangerous situation and actions for solving the dangerous situation may be quickly and smoothly taken.

Figure 11A:
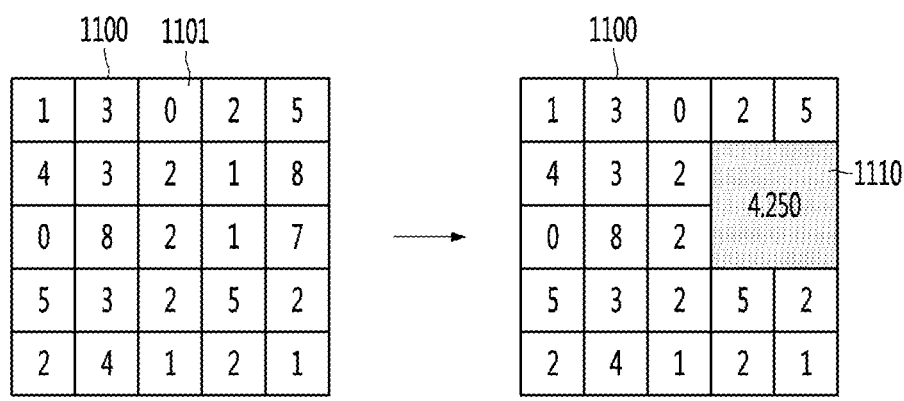
FIGS. 11*a* and 11*b* are views illustrating an example of changing a route to a region in which a dangerous situation is detected while moving along a predetermined route according to an embodiment of the present invention.
Figure 11B:
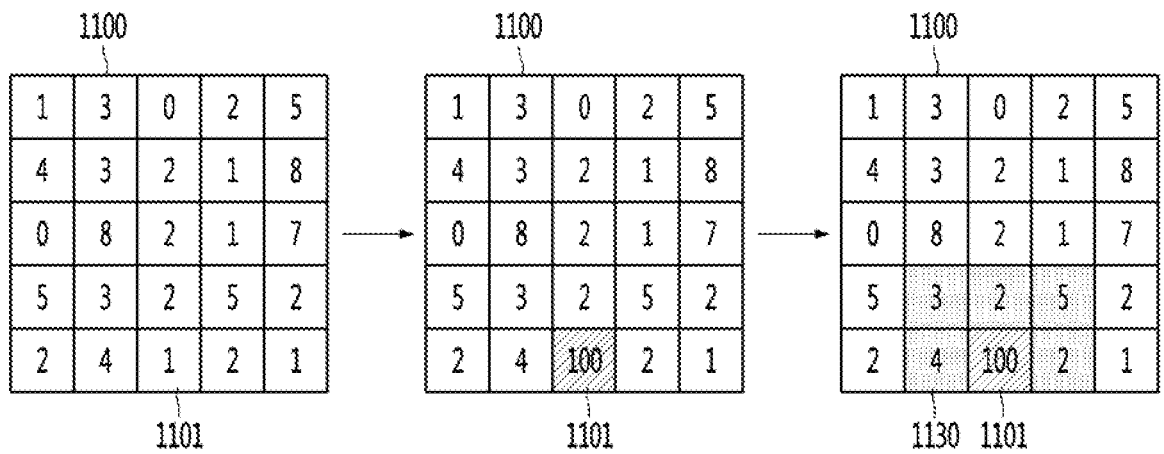

FIGS. 11a and 11b are views illustrating an example of changing a route to a region in which a dangerous situation is detected while moving along a predetermined route according to an embodiment of the present invention.

First, referring to FIG. 11a, the entire region 1100 allocated to the robot 100a and having a square shape is shown.

The entire region 1100 may include a plurality of unit regions.

Each unit region 1101 may have a square shape. In FIG. 11a, the entire region 1100 may be expressed by 5×5 regions. The entire region 1100 may include 25 unit regions.

A density measured based on user information is described in each unit region 1101.

For example, densities <1,3,0,2,5> measured in the unit regions are described in the first row of the entire region 1100.

The density of the unit region may be measured using the image recognition model.

The image recognition model may recognize persons included in an image based on the image captured in the unit region. The processor 180 may acquire the number of recognized persons as the density of the region.

In another example, the density of each unit region may be calculated by the AI server 200 and the calculated densities may be transmitted to the robot 100a.

The memory 170 may store position information indicating the position of each unit region 601. The processor 180 may acquire the coordinates of each unit region using a position measurement module such as a global positioning system (GPS) module.

The position information of each unit region 1101 may be the coordinates of the center of the unit region.

The robot 100a may set the movement route thereof according to the density of each unit region. That is, the robot 100a may first move to a region having a high density and then sequentially move regions having low densities.

The processor 180 may divide the entire region 1100 into a plurality of group regions and calculate an average density based on the densities of the unit regions included in each group region.

For example, each group region may have a 2×2 square shape.

For example, the average density of the group region 1110 may be calculated as (1+8+1+7)/4=4.25.

The movement route of the robot 100a may be set based on the average density of each of the plurality of group regions. That is, the robot 100a may first move to a group region having a highest average density and then move to a group region having a second highest average density.

When there is a unit region in which the dangerous situation is detected while the robot travels, the robot 100a may correct the density of the unit region.

For example, as shown in FIG. 11b, when a dangerous situation is detected in any one unit region 1101 among the plurality of unit regions included in the entire region 1100, the robot 100a may change the density of the unit region 1101.

The robot 100a may receive, from the AI server 200, a danger detection signal indicating that the dangerous situation has been detected in the specific unit region 1101.

The robot 100a may change the density of the unit region 1101, in which the dangerous situation occurs, from 1 to 100. Therefore, the robot 100a may immediately move to the unit region 1101.

In addition, the robot 100a may output a notification prohibiting person's access to the periphery of the unit region 1101 while moving in the unit regions 1130 located around the unit region 1101 in which the dangerous situation has been detected.

Therefore, it is possible quickly take actions for the region in which the dangerous situation has occurred.

Figure 12:
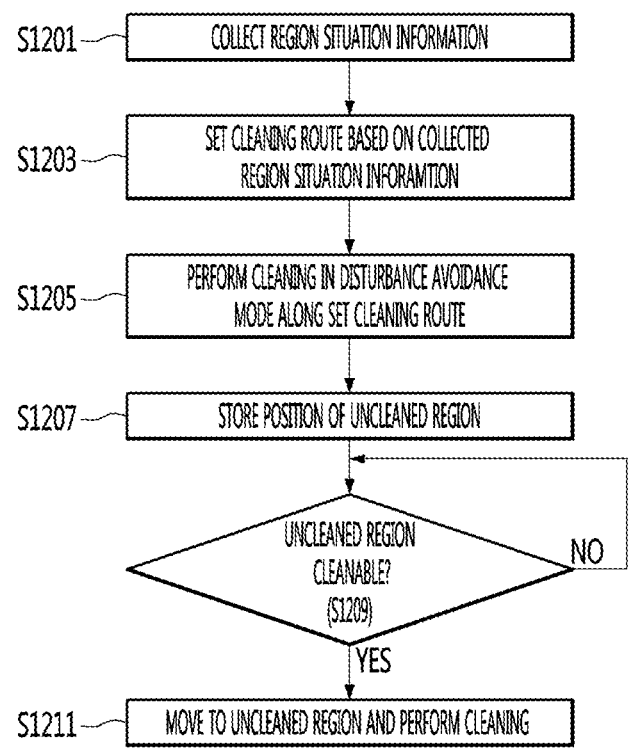
FIG. 12 is a flowchart illustrating a method of operating a robot according to an embodiment of the present invention.

FIG. 12 is a flowchart illustrating a method of operating a robot according to an embodiment of the present invention.

In particular, FIG. 12 is a view illustrating a process performed when the operation mode of the robot 100a which performs cleaning is set to a disturbance avoidance mode.

The disturbance avoidance mode may refer to a mode for avoiding an obstacle when the obstacle is found without disturbing user's activity.

Referring to FIG. 12, the processor 180 of the robot 100a collects region situation information (S1201).

In one embodiment, the region situation information may include information indicating the situation of each of the plurality of regions.

Each of the plurality of regions may be provided with one or more cameras or microphones.

The processor 180 may receive the image data captured by the camera provided in each region and voice data input to the microphone through the communication unit 110.

The processor 180 may determine whether the region is a cleanable region from the image data. The processor 180 may recognize the object or the state of the object from the image data using the image recognition model.

The processor 180 may determine that the region is a non-cleanable region, when the recognized object is a person.

In another example, the processor 180 may determine that the region is a non-cleanable region from the image data or the voice data, when the dangerous situation is detected in the region.

A method of detecting the dangerous situation has been described above.

The processor 180 of the robot 100a sets a cleaning route based on the collected region situation information (S1203).

The processor 180 may set the cleaning region, except for a region where persons are located or a region where the dangerous situation is detected among the plurality of regions.

The processor 180 may set the cleaning region based on the remaining regions other than a region where persons are located or a region where the dangerous situation is detected among the plurality of regions.

The processor 180 performs cleaning in the disturbance avoidance mode along a set cleaning route (S1205).

The processor 180 stores an uncleaned region in the memory 170 while performing cleaning along the cleaning route (S1207).

In one embodiment, the uncleaned region may be a region where cleaning is impossible based on the region situation information.

In another embodiment, the uncleaned region may be a region where cleaning is not performed due to detection of an obstacle while the robot 100a performs cleaning along the cleaning route. The uncleaned region may be any one of a region or a small portion of the region.

The processor 180 may acquire the image data captured through the camera 121 periodically or in real time. The processor 180 may determine whether an obstacle is recognized from the captured image data using the image recognition model.

When the obstacle is recognized, the processor 180 may determine the region or a small portion, in which the obstacle is located, of the region as the uncleaned region.

The processor 180 may store the position information of the uncleaned region where cleaning is not performed in the memory 170. The position information of the uncleaned region may include the coordinates of the uncleaned region.

The processor 180 determines whether the stored uncleaned region is cleanable (S1209) after traveling is completed along the cleaning route.

The processor 180 may determine whether the uncleaned region is switched to a cleanable situation based on the image data received from the camera disposed in the uncleaned region or the voice data received from the microphone.

When it is detected that the dangerous situation has been solved or it is detected that the obstacle has been removed from the image data, the processor 180 may determine the uncleaned region as a cleanable region.

When the voice uttered by a user is not detected from the voice data for a certain time or more, the processor 180 may determine that the uncleaned region is switched to a cleanable situation.

When the uncleaned region is switched to the cleanable situation, the processor 180 moves to the uncleaned region and performs cleaning (S1211).

The processor 180 may control the traveling unit (not shown) to move to the uncleaned region using the position information of the uncleaned region stored in the memory 170.

According to the embodiment of the present invention, the robot 100*a* may perform cleaning while minimizing user's activity. Therefore, the user can feel satisfaction that cleaning is performed without feeling uncomfortable with activity.

In addition, the robot 100*a* recognizes a region where cleaning has not been performed along the cleaning route and performs recleaning, thereby performing cleaning with respect to the entire region.

According to the embodiment of the present invention, the robot can recognize a dangerous situation and notify the outside of the recognized dangerous situation. Therefore, other persons can be notified of the dangerous situation and action for the dangerous situation can be quickly and smoothly taken.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the artificial intelligence device.

What is claimed is:

1. A robot for detecting danger using artificial intelligence, the robot comprising:
    a memory configured to store a danger recognition model comprising a voice recognition model or an image recognition model each comprising an artificial neural network trained using a supervised deep learning algorithm;
    an input unit configured to acquire audio or image data; and
    a processor configured to:
    input the acquired audio or image data to the danger recognition model; and
    output a notification indicating a dangerous situation corresponding to an emergency or hazard based on an output of the danger recognition model given the acquired audio or image data as input,
    wherein the processor is further configured to:
    calculate a density value of people in each of a plurality of regions to determine a movement route of the robot, wherein the density value of a region is based on a number of recognized persons based on the image data, and
    increase a density value of a particular region of the plurality of regions based on detecting the dangerous situation in the particular region such that a priority of the particular region is increased to determine the movement route of the robot.

2. The robot of claim 1, further comprising a light source configured to output light,
    wherein the processor is further configured to control the light source to output the light toward a region corresponding to the dangerous situation.

3. The robot of claim 1, further comprising a communication unit configured to perform communication with an artificial intelligence enabled server,
    wherein the processor is further configured to transmit to the artificial intelligence enabled server, via the communication unit, a request for an action for the dangerous situation.

4. The robot of claim 1, wherein the processor is further configured to:
    acquire additional image data after outputting the notification; and
    drive the robot to move along a predetermined route when the dangerous situation is no longer present based on an output of the danger recognition model given the additional image data as input.

5. The robot of claim 1,
    wherein the robot has a cleaning function, and
    wherein the processor is further configured to store in the memory information of the particular region corresponding to the dangerous situation and perform the cleaning function in the particular region when the dangerous situation is no longer detected in the particular region.

6. A method of operating a robot for detecting danger using artificial intelligence, the method comprising:
    acquiring audio data or image data; and
    inputting the acquired audio data or image data to a danger recognition model stored in a memory of the robot, wherein the danger recognition model comprises a voice recognition model or an image recognition model each comprising an artificial neural network trained using a supervised deep learning algorithm; and
    outputting a notification indicating a dangerous situation corresponding to an emergency or hazard based on an output of the danger recognition model given the acquired audio or image data as input,
    wherein the method further comprises:
    calculating a density value of people in each of a plurality of regions to determine a movement route of the robot, wherein the density value of a region is based on a number of recognized persons based on the image data, and
    increasing a density value of a particular region of the plurality of regions based on detecting the dangerous situation in the particular region such that a priority of the particular region is increased to determine the movement route of the robot.

7. The method of claim 6, wherein the notification includes outputting light toward a region corresponding to the dangerous situation.

8. The method of claim 6, further comprising transmitting, to an artificial intelligence enabled server, a request for an action for the dangerous situation.

9. The method of claim 6, further comprising:
    acquiring additional image data after outputting the notification; and driving the robot to move along a predetermined route when the dangerous situation is no longer present based on an output of the danger recognition model given the additional image data as input.

10. The method of claim 6, further comprising:
storing in the memory information of the particular region corresponding to the dangerous situation; and
performing a cleaning function in the particular region when the dangerous situation is longer detected in the particular region.

* * * * *